United States Patent [19]

Damron

[11] Patent Number: 5,415,511

[45] Date of Patent: May 16, 1995

[54] MULTIPURPOSE ROOFING AND SIDING FASTENER

[76] Inventor: Matthew S. Damron, 533 S. Bayside, Detroit, Mich. 48217

[21] Appl. No.: 61,460

[22] Filed: May 17, 1993

[51] Int. Cl.$^6$ ............................................. F16B 15/02
[52] U.S. Cl. .................................. 411/480; 411/544; 411/155; 411/923; 52/410
[58] Field of Search ............... 411/480, 923, 922, 155, 411/156, 544, 531; 52/410, 411, 408

[56] References Cited

U.S. PATENT DOCUMENTS

| | | | |
|---|---|---|---|
| 1,201,820 | 10/1916 | Hedden | 411/439 |
| 2,353,315 | 7/1944 | Maze | 411/480 |
| 4,395,174 | 7/1983 | Freeman | 411/510 |
| 4,467,581 | 8/1984 | Francovitch | 52/410 |
| 4,790,704 | 12/1988 | Temple | 411/544 |
| 5,112,178 | 5/1992 | Overhues | 411/544 |

FOREIGN PATENT DOCUMENTS

| | | | |
|---|---|---|---|
| 25363 | 12/1919 | Denmark | 411/544 |
| 285030 | 8/1978 | United Kingdom | 411/544 |

*Primary Examiner*—Flemming Saether
*Attorney, Agent, or Firm*—Gifford, Krass, Groh, Sprinkle, Patmore, Anderson & Citkowski

[57] ABSTRACT

A roofing and siding fastener for securing underlayments, exterior insulation sheathings, and similar membranes to a substrate. The disclosure comprises a cap portion having a rectangular body with oppositely extended legs. Said legs are bent downward and have heels situated at the ends. The cap has a nail centrally inserted through the body. The installer positions the fastener over the material to be secured and strikes the nail head, thereby driving the fastener into a substrate. As the cap portion engages the material, the heels act to deflect the flattening legs over the top surface of the material instead of allowing the legs to puncture. Each flattened leg now becomes a spring-like binder which not only provides superior holding power over the prior art, they also flex upward to dampen strong winds which can blow these underlayments off. This flexibility greatly enhances the effectiveness of underlayments in a "dry-in" procedure. The disclosure also greatly enhances the safety of walking on pitched roof underlayments. The holding power of the disclosure reduces installation time by 50 percent.

9 Claims, 2 Drawing Sheets

MULTIPURPOSE ROOFING AND SIDING FASTENER

TECHNICAL FIELD

This invention relates in general to fasteners used in the construction trades and in particular to fasteners which are used to secure underlayments, insulation, and sheathings to the roof substrates and wall framings of building structures.

BACKGROUND OF THE INVENTION

In the roofing trades there are generally two types of roof surfaces. One is a pitched surface and the other a flat or commercial surface. In both situations, materials which are thin in nature are rigidly attached to the substrate, or deck. These thin materials are more commonly referred to as underlayments. Their primary function is to prevent water and vapor penetration into the structure proper. They are generally made from an organic mat which is saturated in a petroleum distillate. The underlayments usually come in three-foot rolls and are applied to the deck in horizontal courses starting at the eave or low point of the deck having each following course lap of the previous. When installed correctly, any moisture will wash over the courses and off the roof.

Due to the said thin nature of these underlayments, it would seem appropriate to have a designated fastener for the attachment of such to the roof deck. There are currently many fasteners used to apply underlayments to roof decks and indeed some even claim to be designated underlayment fasteners. However, as will be described, these and other fasteners not only do a poor job, they cause underlayment failure resulting in structural damage, and injury to the installer from sliding on loose material. The most common fastener used to secure an underlayment would be a shingle roofing nail. The head of this fastener is usually five-eighths in diameter and has a shank portion of one inch and better. The problem with this nail is it tends to "blow" through the underlayment due to the sheer force needed to install it. Subsequently, extra time and care are necessary to assure the nails are not puncturing the underlayment ultimately resulting in lost productivity. Also of concern is the poor lateral holding power of this nail. When walked upon, the only portion of the nail preventing the underlayment from tearing loose (on a pitched roof) is the gauge, or thickness of the nail shank itself. Such an occurrence did in fact take place causing injury to the worker as he slid off the roof. This was a compelling factor in designing the present invention. As further outlined, the above-mentioned nail, and others, provide very little holding power against the wind. In new construction structures with a pitched roof, it is common for the underlayment to be installed over the skeletal framework of the structure, sometimes weeks ahead of the shingles. This process is called a "dry-in" procedure. It allows the continuance of interior work in foul weather and provides a temporary water barrier. In many situations, the "dry-in" blows off after a few days due to the ineffective holding power of the aforementioned nail which results in damage to the structure from rain, additional materials, and extra labor to reinstall same. A final problem typically encountered by using shingle nails would be the many punctures left in the underlayment from them not seating into the deck properly. Many times the nail will abruptly alter its course while being driven in (if you hit a knothole or gap in the roof boards), thereby causing the head of the nail to make contact with the underlayment at such an angle as to cause the edge of the nail head to cut through the underlayment. The resulting aperture, left as is, will allow water to seep into the structure.

Another type of fastener found presently in the art is a one inch diameter "cap" nail. It basically provides better service due to increased size of the head. It holds better than the shingle nail in windy conditions. However, it still provides poor lateral holding power as again the only portion of the fastener preventing tear out is the shank, which is very thin. This type of fastener is primarily used to secure insulation board and base sheet materials to flat, or commercial, roof decks. However, it is used on pitched roofs as stated above. This fastener is more expensive than shingle nails, thereby prohibiting its widespread use on pitched roofs.

One other embodiment of the "cap" nail utilizes a one inch in diameter cap, or head, made of plastic. It has an ardox-type shank extending centrally through the slightly domed cap. It is used on underlayments and wall sheathings. When installed the dome flattens, thereby putting passive pressure against the underlayment binding it to the pitched roof deck. However, this fastener is not only more expensive than the present invention, it loses most of its holding power in direct sunlight and as the temperature increases. The thickness of the plastic head of this fastener is such that, in certain situations, they can hold up an area of the shingle preventing it from seating flatly to the roof deck.

There are other fasteners such as tacks and a multitude of staples which can be used to attach underlayments to a roof deck. Staples do not work as there is no way to adjust the impact which usually results in "blow" throughs, and violate some local building codes. Tacks are generally too small to hold the underlayment in windy conditions.

As can be understood by the problems outlined above, there is a real need for the present invention. The objectives of the present invention therefore will be to provide a roofing fastener having a greatly improved holding capability against wind uplift and lateral tear out. This improvement will therefore reduce the amount of fasteners needed per job.

Another objective of the present invention is to provide a fastener which can be produced at a lower cost than the prior art.

And still another objective of the present invention is to provide a multipurpose roofing and siding fastener which reduces the amount of punctures in the underlayment, thereby allowing the underlayment to withstand the weather for longer periods of time in a "dry-in" procedure.

SUMMARY OF THE INVENTION

In light of the foregoing problems and to fulfill the above-stated objects, there is provided, according to one aspect of the present invention, a designated multiuse underlayment fastener which reduces installation time, does not damage the surface area, makes it safer to walk upon it, is cheaper to purchase and manufacture, and can be used to fasten a wide range of underlayments. This is done by having an upper portion of the present invention support four downward extended legs which flatten out upon impact, thereby snugly securing an underlayment to a substrate and each leg maintaining a spring-like bind on the material. Centrally extended through the upper body of the fastener, the shank or nail portion of the present invention is driven into the deck whereby the head of the shank, being larger than the receiving hole in the body, pulls the body portion to a point where the underside interfaces the upper surface of the underlayment and rigidly binds said surface to the deck. Once seated, the fastener maintains five individual binding points against the captive underlayment. Each leg thereby has its own binding radius and will flex upwardly to relieve wind-induced underlayment movement.

The overall length of the preferred embodiment from tip to tip is one inch but can extend to four inches. The preferred shank length is one inch but can extend three inches. The body portion having four oppositely extended legs can be stamped from a multitude of materials. In a preferred embodiment a 0.012–0.014 galvanized steel with a medium carbon content is pierced with a nail portion of similar material.

In another embodiment of the present invention, the shank portion consists of a helical twist which prevents the shank from loosening from the deck due to the legs flexing.

Another embodiment of the present invention has each leg extended downward 30° from the upper body portion, whereas said body is parallel to the deck surface, and whereas said legs have heels situated at the ends to receive the underlayment and divert the legs over the surface of the underlayment, thereby preventing said legs from puncturing the material. Once the legs are extended to their maximum, the heel portion provides a smooth point of contact against the underlayment in cases where uplift occurs, which is usually wind driven. By having the legs of the fastener flex with the wind uplift, the force behind the uplift is dampened and the passive springness of the steel legs return the underlayment to the roof deck. Previously, any wind-induced uplift in the underlayment would cause the material to tear loose. The sheer rigidness of the art is such that the edges of the fastener act to cut through the underlayment.

By installing the present invention, one could actually achieve the same results by driving a nail through the center of a helical cone-shaped spring about the size of a thimble. Once the spring flattens, it maintains a bind, but also flexes, or absorbs.

By these embodiments, one can see that there is provided an improved fastener for installing roofing materials and siding materials to building structures. Accordingly, these and other features, objects, and advantages of the present invention will become more readily understood by studying the following detailed description of the preferred embodiments taken in conjunction with the attached drawings and claims.

BRIEF DESCRIPTION OF THE DRAWINGS

In the drawings, where like reference numerals are used to indicate identical components in the various Figures.

DETAILED DESCRIPTION OF THE EMBODIMENTS

Figure 1:
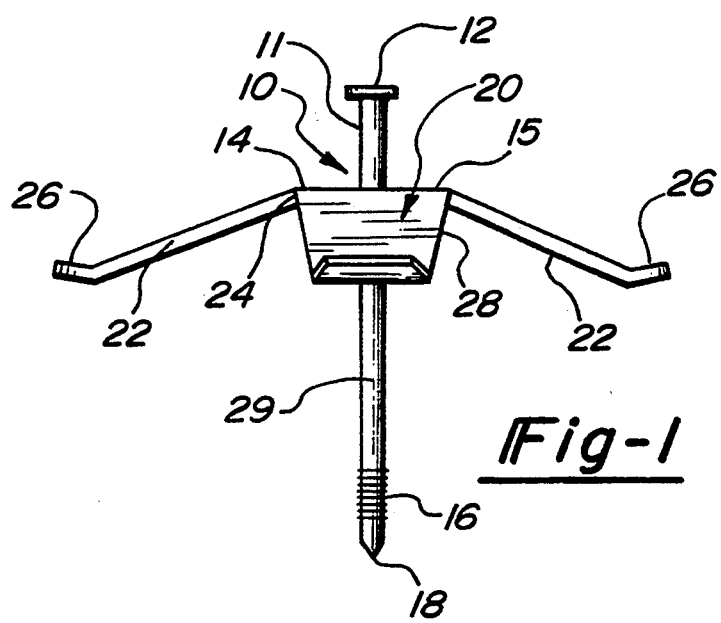
FIG. 1 is a perspective view of a preferred embodiment of the present invention showing a roofing fastener with a leg-span of one inch, and a shank length of 1.250.

With combined reference to all the figures, an underlayment fastener is generally denoted by the numeral 10. As seen in FIG. 1, a fastener 10 has a nail portion 11 centrally positioned through a multi-legged crown portion 20. The nail 11 has a head 12 which is larger in diameter than the nail shaft 29. In a stamping process, the nail 11 is forced through the body 14 of the crown 20 until the head 12 rigidly contacts the body surface 15. The fastener 10 is held above the intended point of penetration and driven into place by striking the nail head 12. The nail point 18 then penetrates and continues inward until the under surface 28 of the body 14 interfaces the material to be held to a substrate.

A plurality of oppositely situated legs 22 extend downward from the body 14 thirty degrees. At the transitional points where the legs 22 adjoin the body 14, there are situated knees 24 which communicatingly flex inward and outward depending on the directional force exerting the pressure. Therefore the knees 24 also act as "living" hinges. Situated at the ends of the legs 22 are heels 26 which engage the surface of the underlayment and deflect the energy of the impact outwardly from the epicenter, thereby preventing the legs 22 from digging into the underlayment.

Once the fastener 10 is fully seated, the ringed barbs 16 embed into the substrate interior and prevent the fastener 10 from backing out.

Figure 2:
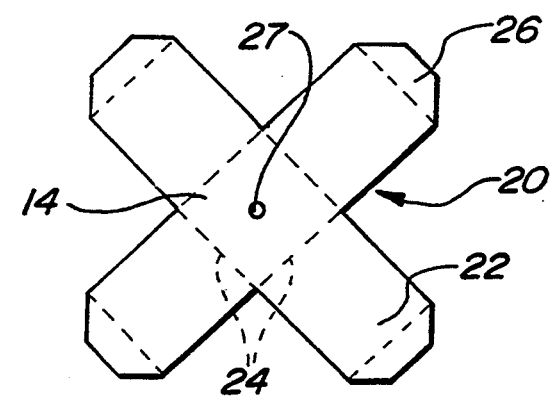
FIG. 2 is a top plan view of the body and leg portion of the present invention without the nail portion. The phantom lines indicate transitional vectors from a main body-to-leg and leg-to-heel configuration.

FIG. 2 shows a flat top profile of the crown 20 prior to the forming of the legs 22 and heels 26. Centrally located in the crown body 14 is the nail access hole 27.

Figure 3:
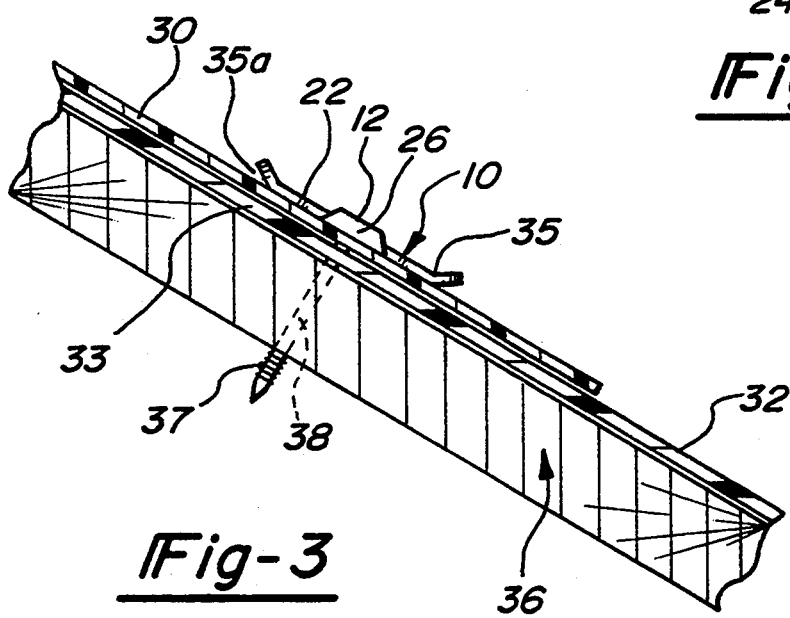
FIG. 3 is a fragmentary, lateral perspective view of a pitched roof surface, whereas the fastener of FIG. 1 is shown fully installed over a common underlayment lap.

FIG. 3 shows the fastener 10 as driven through a dominant course of underlayment 30 and the preceding course 32 and into a pitched substrate 36. On a pitched roof of 4-12 and better, a lap 33 of four inches is normal. The fastener 10 is centered over the lap 33 and the nail head 12 is engaged with a striking tool (not shown) and rigidly seated. Once the heel 26 of each leg 22 makes contact with the underlayment 30, the crown body 14 forces the legs 22 outward until the body 14 and legs 22 are flat to the substrate 36. The optimum binding point 35 is now transferred to the edges 35a of each leg 22. As is to be expected, once the entire plane of the substrate 36 is covered with underlayment, winds will catch the leading edge 34 of each lap 33 and cause the underlayment 30 to lift. The legs 22 of the fastener 10 will flex slightly to dampen the wind-induced uplift of the underlayment 30 and forcefully return it to its captive position of attachment to the substrate 36. The fastener 10 has a shank 38 with rings 37 which prevent the fastener 10 from loosening.

Figure 4:
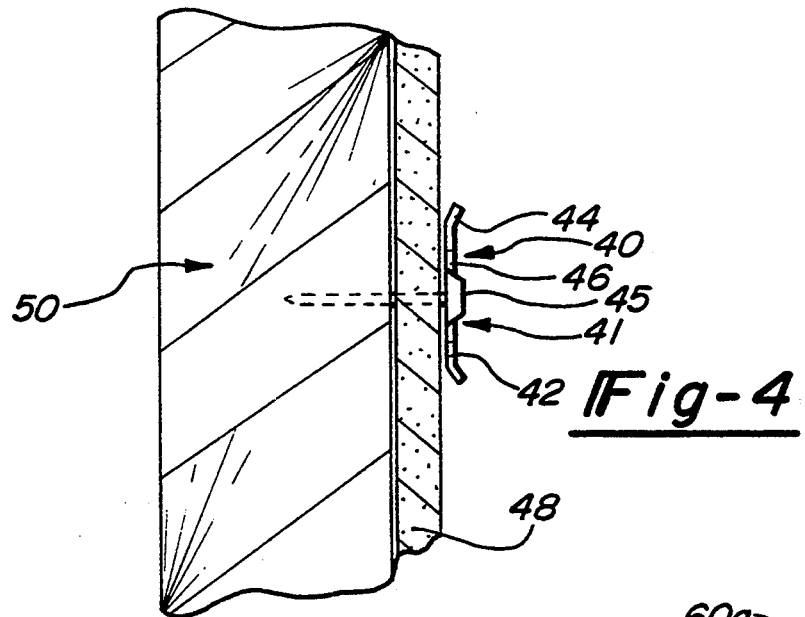
FIG. 4 is an elevational side view of the present invention depicting insulation sheathing as affixed to an exterior wall stud.

Another embodiment, seen in FIG. 4, depicts the fastener 40 being used to secure an insulation sheathing 48 to an exterior wall stud 50. By having the crown portion 41 bind the sheathing 48 to the wall stud 50, a reduction of fasteners 40 are required, As viewed, the legs 42 are flattened against the sheathing 48. Situated at the ends of legs 42 are heels 44 which cause the legs 42 to skim over the sheathing 48 while the nail head 45 collapses the crown body 46 flush to said wall stud 50.

Figure 5:
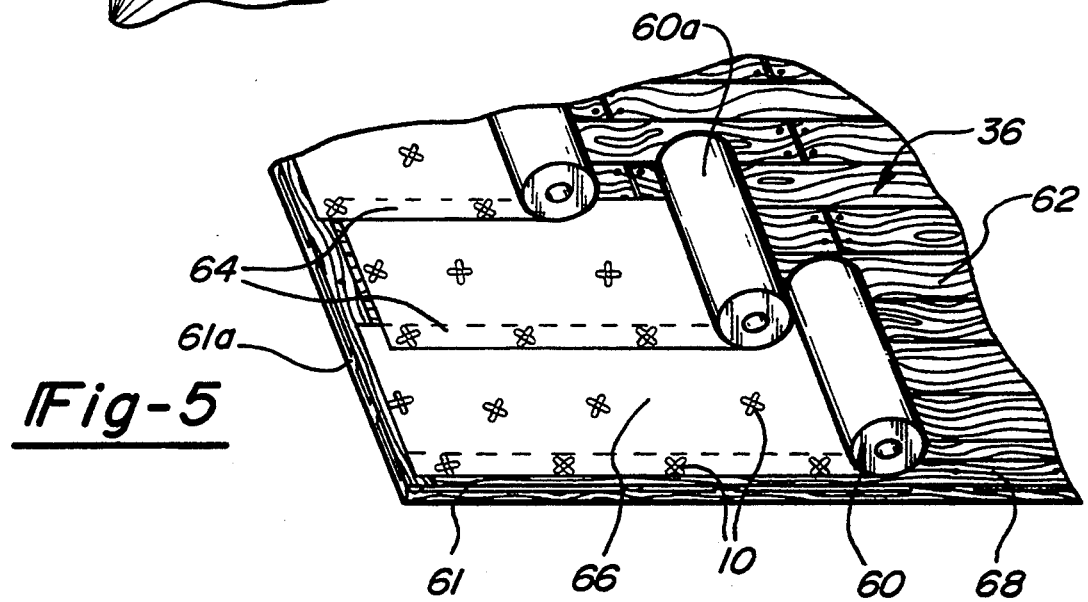
FIG. 5 is a perspective view of a pitched roof surface with rolls of underlayment affixed thereon. Also depicted are fasteners of the present invention as randomly installed.

FIG. 5 shows an underlayment roll material 60 as applied to a pitched substrate 36. Starting at the eave 68 and to the rake edge 61a, fasteners 10 are randomly applied to the edge 61 and field 66 as needed. The roll 60 is laid out along the eave 68 and trimmed even to the opposite rake edge (not shown). Depending on the pitch of the substrate 36, the amount of fasteners 10 driven into roof boards 62 are proportional to the amount of weight exerted laterally and the condition of the elements. The next dominant course 60a is set over the first course 60 using a standard four inch lap 64. Fasteners 10 are again randomly installed as needed. Each course is thus applied until the entire plane is covered.

Figure 6:
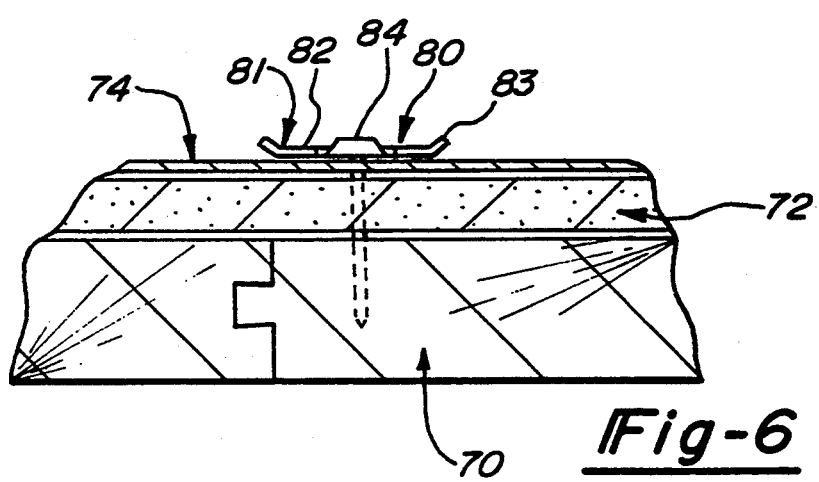
FIG. 6 is a fragmentary, perspective view of the present invention installed through a base sheet roll roofing material, then through a fiber board insulation material, and finally into a substrate.

FIG. 6 shows a fastener 80 fully seated into a tongue-and-groove substrate 70, thereby binding a base sheet underlayment 74 and an insulation board 72 between the crown portion 81 and the tongue-and-groove substrate 70. The springness of the legs 82 allow them to fluctuate inward or outward, thereby maintaining a constant level of tension to the base sheet 74 and insulation board 72. Expansion and contraction of the insulation board 72 occurs when condensation builds up due to temperature changes, for example. Structural movement is another example.

While the foregoing embodiments of the present invention are well suited to achieve the above-stated objects, those skilled in the art should realize that such embodiments are subject to modification, alteration, and change without departing from the scope of the present invention. For example, the fastener could resemble a helical cone-shaped spring with a nail centrally located through it.

As another example, additional extremities could be made to extend from the body of the fastener, and angled to a different pitch. Other variations will no doubt occur to those skilled in the art upon the study of the description and drawings contained herein. Accordingly, it is to be understood that the present invention is not limited to the specific embodiments described herein, but should be deemed to extend to the subject matter defined by the appended claims, including all fair equivalents thereof.

I claim:

1. A fastener for use with a nail for securing an underlying roofing material to a roof substrate, said fastener comprising:
   a planer flat body portion;
   two pairs of planer flat legs extending outwardly at an angle with respect to said body portion, one pair of said two pair extending on a first axis and an other pair of said two pair extending on a second axis normal to said first axis, each leg having a free outer end;
   an aperture in said body portion for receiving the nail; and
   wherein the roofing material is secured against the roof substrate by said plurality of legs upon penetration of the nail in the substrate.

2. The fastener as described in claim 1, wherein said plurality of legs extend downwardly from said body portion in a direction towards a pointed tip of the nail.

3. The fastener as described in claim 2, wherein said plurality of legs extend from said body portion at an angle of up to 30 degrees.

4. The fastener as described in claim 1, wherein said legs are constructed of a resilient material so that said legs flex in response to the penetration of the roofing nail into the substrate so as to become substantially planer with said body portion and the substrate upon full penetration by the nail.

5. The fastener as described in claim 1 further comprising heel portions which are connected to said legs and are angled with respect to the legs such that outer edges of said heel portions terminate in a direction obtuse from the roof substrate.

6. The fastener as described in claim 1, wherein said legs are constructed of a flexible material so that said legs are capable of flexing in response to movement of the roofing material and so that said legs maintain a biasing contact against the roofing material to thereby secure the material against the substrate.

7. The fastener as described in claim 1, wherein said fastener is constructed of a metal.

8. The fastener as described in claim 1, wherein said fastener is constructed of a plastic.

9. A fastener for securing an underlying roofing material to a roof substrate, said fastener comprising:
   a planer flat body portion;
   two pair of planer flat legs extending outwardly at an angle with respect to said body portion, one pair of said two pair extending on a first axis and an other pair of said two pair extending on a second axis normal to said first axis, each leg having a free outer end;
   a nail having a head portion and a shank portion, said shank portion having a plurality of annular barbs placed thereon;
   an aperture in said body portion for receiving said nail; and
   wherein said annular barbs become embedded in the roof substrate upon penetration by said nail so as to prevent disengagement of said fastener from the roofing material.

* * * * *